United States Patent [19]

Makita

[11] Patent Number: 4,567,969

[45] Date of Patent: Feb. 4, 1986

[54] GEARSHIFT SYSTEM FOR AN AUTOMOBILE

[75] Inventor: Fujio Makita, Hachioji, Japan

[73] Assignee: Fuji Jukogyo Kabushiki Kaisha, Tokyo, Japan

[21] Appl. No.: 524,949

[22] Filed: Aug. 22, 1983

[30] Foreign Application Priority Data

Aug. 31, 1982 [JP] Japan .................. 57-151367

[51] Int. Cl.$^4$ .......................... B60K 41/22
[52] U.S. Cl. ................ 192/3.56; 74/335; 74/365; 74/473 R; 192/3.62; 192/21.5; 192/82 T; 200/61.88
[58] Field of Search .............. 192/0.052, 0.075, 0.076, 192/0.092, 3.56, 3.62, 21.5, 82 T; 74/473 R, 335, 365, 359, 375; 200/61.88

[56] References Cited

U.S. PATENT DOCUMENTS

| | | | |
|---|---|---|---|
| 2,034,400 | 3/1936 | Kesling | 74/335 |
| 3,793,898 | 2/1974 | Espenschied et al. | 74/335 |
| 4,403,683 | 9/1983 | Takano | 192/21.5 X |
| 4,449,619 | 5/1984 | Sakakiyama | 192/21.5 X |
| 4,461,374 | 7/1984 | Umezawa | 192/21.5 |
| 4,463,623 | 8/1984 | Miyata et al. | 74/473 R |
| 4,473,142 | 9/1984 | Makishima | 74/473 R X |
| 4,484,672 | 11/1984 | Takano et al. | 192/21.5 X |

Primary Examiner—Rodney H. Bonck

Attorney, Agent, or Firm—Martin A. Farber

[57] ABSTRACT

A gearshift system for an automobile with an electromagnetic powder clutch and a transmission having four forward-gear sets. The system comprises a first synchronizing device for selectively engaging a second speed gear and a fourth speed gear with an output shaft of the transmission, a second synchronizing device for selectively engaging a first speed gear and a third speed gear with the output shaft, a first shifter arm for operating the first synchronizing device, and a second shifter arm for operating the second synchronizing device. A select lever is provided to engage one of the first and second shifter arms. The select lever is operated by a manual shift lever for shifting one of the shifter arms. Further, the select lever is moved by an electric actuator so as to engage with one of the shifter arms for the selection of the synchronizing device. Switches are provided for producing signals representing a selection of one of the synchronizing device, and a thermo switch responsive to the temperature of the automatic clutch for producing an output signal when the temperature exceeds a predetermined temperature. A control circuit is responsive to the signals of the switches for operating the electric actuator to select one of the synchronizing devices, and responsive to the output signal of the thermo switch for operating the electric actuator to select the second synchronizing device.

7 Claims, 9 Drawing Figures

GEARSHIFT SYSTEM FOR AN AUTOMOBILE

BACKGROUND OF THE INVENTION

The present invention relates to a system for a gearshift of an automobile with an automatic clutch such as an electromagnetic clutch, and more particularly to a system which enables the gearshift to be operated by shifting a shift lever on a straight line.

An electromagnetic powder clutch for an automobile comprises an annular drive member secured to a crankshaft of an engine, a magnetizing coil provided in the drive member, a driven member secured to an input shaft of a transmission spaced so as to leave a gap from the drive member, and a shift lever for changing gears in the transmission. The shift lever is provided with a tilted knob and switches. The knob is tiled with respect to the shift lever by a force applied through the driver's hand, when the shift lever is shifted. The switches are actuated by the knob for controlling the electric current flowing in the magnetizing coil. As an accelerator pedal is depressed, the clutch current passing through the coil increases. The magnetic powder is aggregated in the gap between the drive member and the driven member, so that the driven member is coupled to the drive member. Thus, the automobile can be smoothly started by suitably depressing the accelerator pedal with slippage of the clutch. Such a system is disclosed in a plurality of patent publications, for example, in Japanese patent laid-open specification No. 56-60733.

Today, many cars are equipped with four-speed transmissions. Accordingly, the shift lever must be shifted along an H-shaped shift pattern for the forward driving. Although no clutch pedal operation is required in such a car, the driver is not yet free from a complex shift lever operation.

In order to simplify the operation of the shift lever, I have disclosed a gearshift system in my co-pending patent application Ser. No. 524,948 filed on Aug. 22, 1983, the same date as the filing of the present patent application, in which four forward-gear sets of a transmission are shifted by shifting a shift lever on a straight line. In the system, the four forward-gear sets are divided into a high power transmission system and a low power transmission system, and an electric actuator is provided for operating a select device to select one of the power systems. The low power transmission is designed to produce sufficient power to start and drive an automobile on flat roads. However, the electromagnetic clutch control system is so arranged as to cause the electromagnetic clutch to slip for a long time at the engagement thereof during the low power transmission driving. Therefore, if the automobile is driven only by the low power transmission, the clutch tends to overheat causing damage to engaging member and electric conductors.

SUMMARY OF THE INVENTION

An object of the present invention is to provide a system which operates to automatically change a low power transmission system to a high power transmission system when the temperature of an electromagnetic clutch exceeds a predetermined temperature, whereby overheating of the clutch can be prevented.

According to the present invention, there is provided a gearshift system for an automobile with an automatic clutch and a transmission having four forward-gear sets, comprising: a first synchronizing device for selectively engaging a second speed gear and a fourth speed gear with an output shaft of the transmission, the second speed gear having a gear ratio producing a sufficient torque to start the automobile; a second synchronizing device for selectively engaging a first speed gear and a third speed gear with the output shaft; a first shifter means for operating the first synchronizing device; a second shifter means for operating the second synchronizing device; a select lever adapted to engage one of the first and second shifter means; a manually operated shift lever; means for transmitting the shift of the shift lever to the select lever for shifting one of the shifter means; an electrical select device for operating the select lever means to engage with one of the shifter means; switch means for producing signals representing a selection of one of the synchronizing devices; a thermo switch responsive to the temperature of the automatic clutch for producing an output signal when the temperature exceeds a predetermined temperature; and control circuit means responsive to the signals for operating the electrical select device to select one of the synchronizing devices, and responsive to the output signal of the thermo switch for operating the electrical select device to select the second synchronizing device.

Other objects and features of the present invention will be more apparent from the following description with reference to the accompanying drawings.

DETAILED DESCRIPTION OF THE PREFERRED EMBODIMENT

Figures 1, 1A:
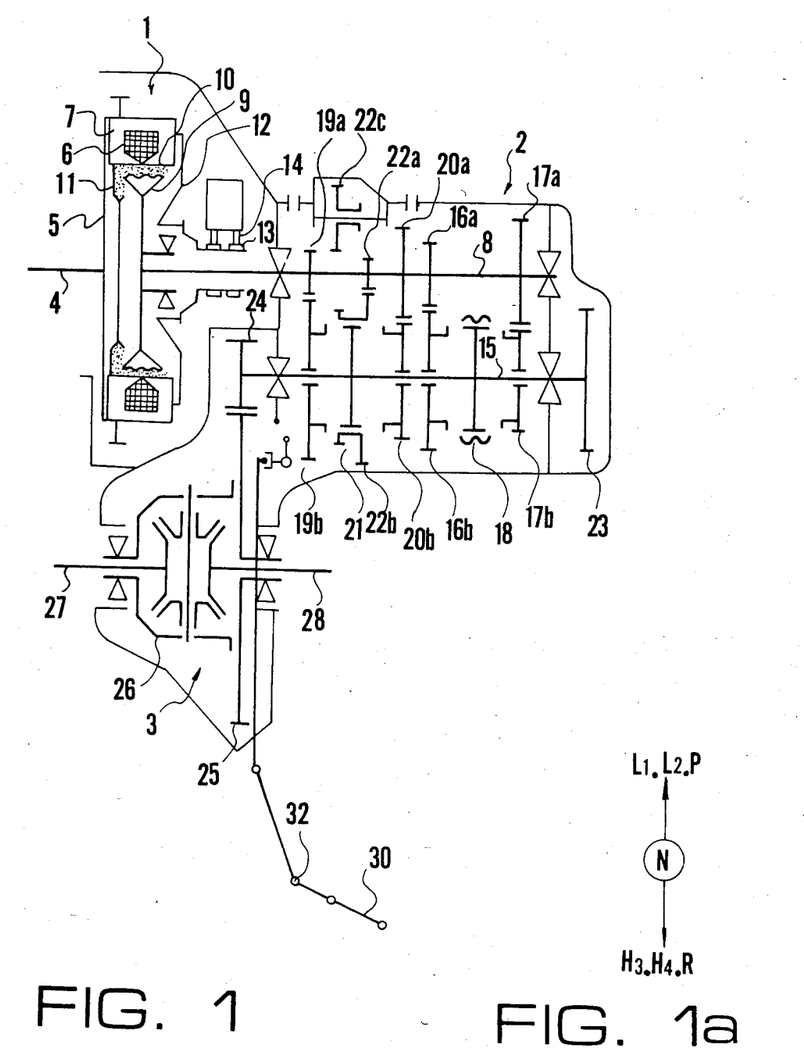
FIG. 1 is a sectional view of a transmission with an electromagnetic powder clutch used in a system according to the present invention.
FIG. 1a shows a gearshift pattern in the transmission of FIG. 1.

Referring to FIG. 1 showing a transmission to which the present invention is applied, an electromagnetic powder clutch is generally designated by a reference numeral 1. A four-speed transmission 2 is operatively connected to the clutch 1, which in turn is connected to a final reduction device 3.

The electromagnetic powder clutch 1 is provided in a clutch case and comprises a drive plate 5 attached to the end of a crankshaft 4 of an internal combustion engine (not shown), an annular drive member 7 secured to the drive plate 5, a clutch coil 6 provided in the drive member 7, and a driven member 9 secured by a spline engagement to an input shaft 8 of the transmission 2, defining a gap 10 with respect to the drive member 7. magnetic powder material is provided in a powder chamber 11 and the gap 10 is adapted to be filled with the powder. A cap 12 is secured to the drive member 7. The cap 12 has a cylindrical portion coaxial with the input shaft 8, on which slip rings 13 are securely provided. The slip rings 13 are connected to the coil 6 by leads and brushes 14 are pressed against the slip rings 13.

In such construction, the drive plate 5 and the drive member 7 rotate together with the crankshaft 4 and the magnetic powder sealed into the powder chamber 11 is drawn on the inner surface of the drive member 7 by centrifugal force. If the coil 6 is excited, the drive member 7 is magnetized to produce a magnetic flux passing through the driven member 9. Thus, the powder is aggregated in the gap 10, so that the power of the engine is transmitted to the input shaft 8 through the clutch.

In the transmission 2, first to fourth speed gear sets are provided. In accordance with the present invention, the second speed gear set and the fourth speed gear set are adjacent each other for providing a low power transmission system, and the first speed gear set and third speed gear set are adjacent for a high power transmission system. The second speed gear set comprises a second speed drive gear 16a formed on the input shaft 8 and a second speed driven gear 16b engaged with the drive gear 16a and rotatably mounted on an output shaft 15. The fourth speed gear set comprises a drive gear 17a and a driven gear 17b rotatably mounted on the output shaft 15. Between the driven gears 16b and 17b, a synchronizing device 18 is mounted on the output shaft 15 in order to engage selectively the driven gears 16b and 17b with the output shaft 15. Similarly, the first speed gear set comprising a drive gear 19a and a driven gear 19b is adjacent the third speed gear set comprising a drive gear 20a and a driven gear 20b. A synchronizing device 21 is provided between the driven gears 19b and 20b. The second speed gear set and the first speed gear set are located on the same sides of synchronizing devices 18 and 21 and the third speed gear set and the fourth speed gear set are located on the opposite side of respective synchronizing device.

A reverse drive gear 22a is formed on the input shaft 8 and a driven gear 22b is formed on one side of a sleeve of the synchronizing device 21. An idler gear 22c is adapted to be engaged with the gears 22a and 22b for the reverse drive. Further, a parking gear 23 is formed on one end of the output shaft 15 for locking the drive power transmission system during parking of the car.

The gear shift pattern of the transmission is shown in FIG. 1a, where "L$_1$", "L$_2$" indicate 1st speed and 2nd speed positions. "H$_3$", "H$_4$" indicate 3rd speed and 4th speed positions, "N" is a neutral position, and "P" and "R" are parking and reverse positions, respectively.

Further, provided on an end of the output shaft 15 is an output gear 24 which is engaged with a ring gear 25 of a differential 26 of the final reduction device 3 to transmit the output of the output shaft 15 to driving wheels of the vehicle through wheel shafts 27 and 28.

Figure 2:
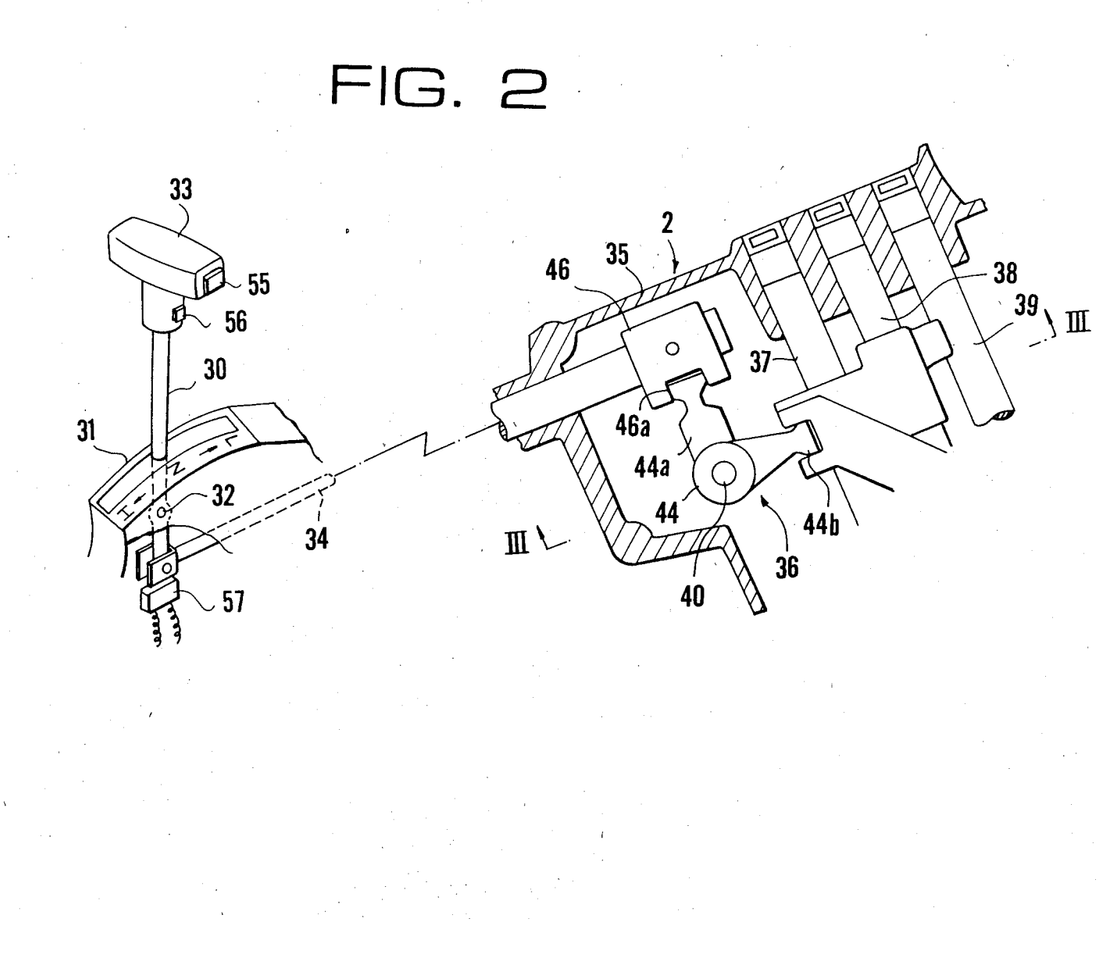
FIG. 2 shows a shift lever and a part of a shift mechanism.

Referring to FIG. 2, a shift lever 30 is rotatably supported by a shaft 32 in a console box 31 so as to be shifted on a straight line in the longitudinal direction of the automobile. A T-shaped knob 33 is attached to an upper portion of the shift lever 30 and an end of an actuating rod 34 is connected at a lower portion of the shift lever by a pin. Secured to the other end of the actuating rod 34 is a fork 46, a recess 46a of which is engaged with an arm 44a of the select lever 44 of an electrical select device 36 in a case 35.

Figure 3:
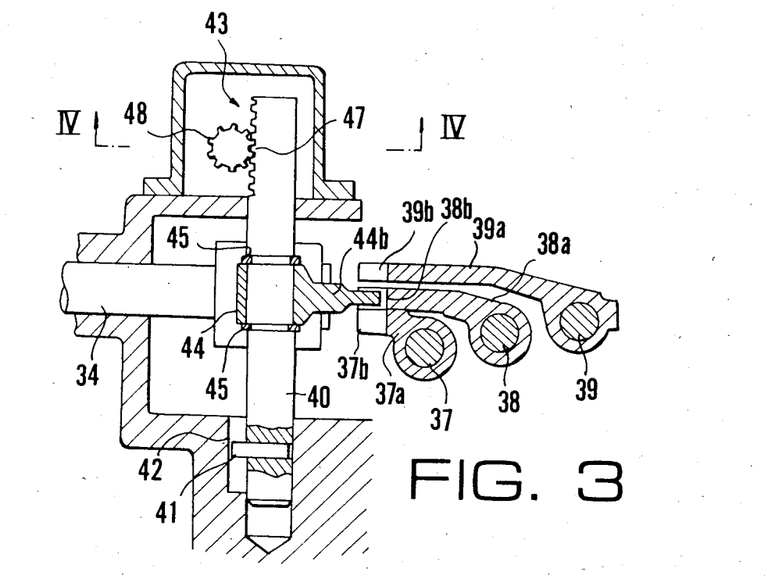
FIG. 3 is a sectional view taken along the line III—III of FIG. 2.
Figure 4:
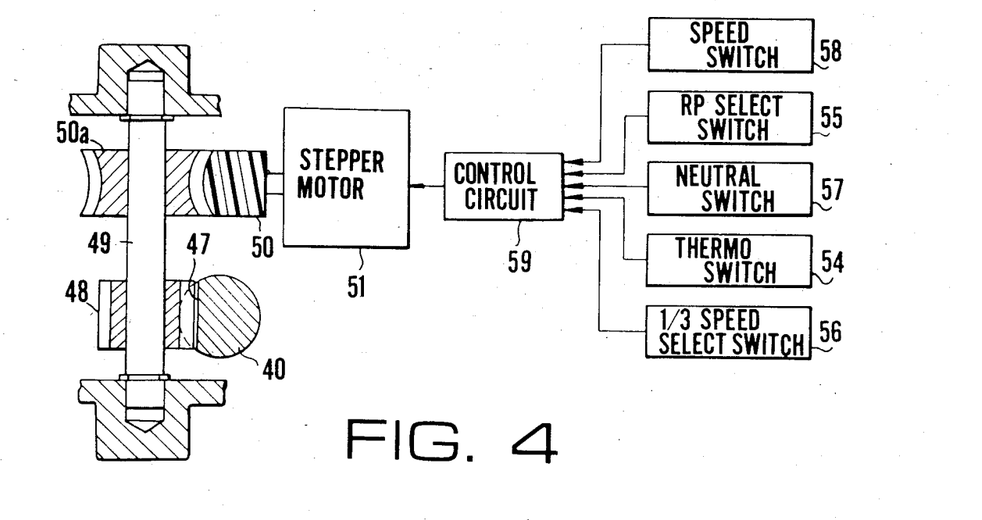
FIG. 4 shows a section taken along the line IV—IV of FIG. 3 and a block diagram of an electric control system.

Referring to FIGS. 2 to 4, the electrical select device 36 comprises a vertical slidable select shaft 40, select lever 44, and electric actuator 43. The select shaft 40 is provided with a laterally projecting pin 41 which is slidably engaged with a vertical guide groove 42 so as to guide the select shaft. The select lever 44 is rotatably mounted on the select shaft 40 and held by upper and lower snap rings 45 engaged with the select shaft 40. The electric actuator 43 comprises a stepper motor 51, a worm 50 secured to the shaft of the stepper motor, worm wheel 50a secured to a rotary shaft 49, and a pinion 48 secured to the shaft 49. The pinion 48 engages with a rack 47 formed on the shaft 40 at an upper portion thereof. Thus, rotation of the worm 50 by the stepper motor 51 causes the shaft 40 and select lever 44 to axially move. The recess 46a has a sufficient axial length to keep the engagement with the arm 44a during the axial movement of the shaft 40.

Another arm 44b of the select lever 44 is adapted to be selectively engaged with one of forks 37b, 38b and 39b of shifter arms 37a, 38a and 39a. The shifter arms are secured to shifter rails 37, 38 and 39, respectively and are vertically arranged so as to selectively and operatively engage with the arm 44b at the neutral position. The shifter rail 37 is for the 1st and 3rd speeds (L$_1$, H$_3$) and adapted to operate the synchronizing device 21 with a fork (not shown), shifter rail 38 is for the 2nd and 4th speeds (L$_2$, H$_4$) and adapted to operate the synchronizing device 18, and shifter rail 39 is for the reverse gear 22c and parking gear 23.

Referring to FIGS. 2 and 4, a reverse and parking select switch 55 (hereinafter called RP select switch) and a high power transmission system select switch 56 are mounted on the knob 33. A neutral switch 57 is provided beneath the shift lever 30 so as to turn on at the neutral position of the shift lever. The system is further provided with a car speed switch 58 and a thermo switch 54 for detecting the temperature of the electromagnetic clutch. The car speed switch 58 is turned on while the automobile is moving, and the thermo switch 54 is on when the temperature of the clutch exceeds a predetermined temperature. These switches 54 through 58 are electrically connected to a control circuit 59 for operating the stepper motor 51. The RP select switch 55 is turned off when the button of the switch on the knob is manually operated and the high power transmission system select switch 56 is on when operated.

Figure 5:
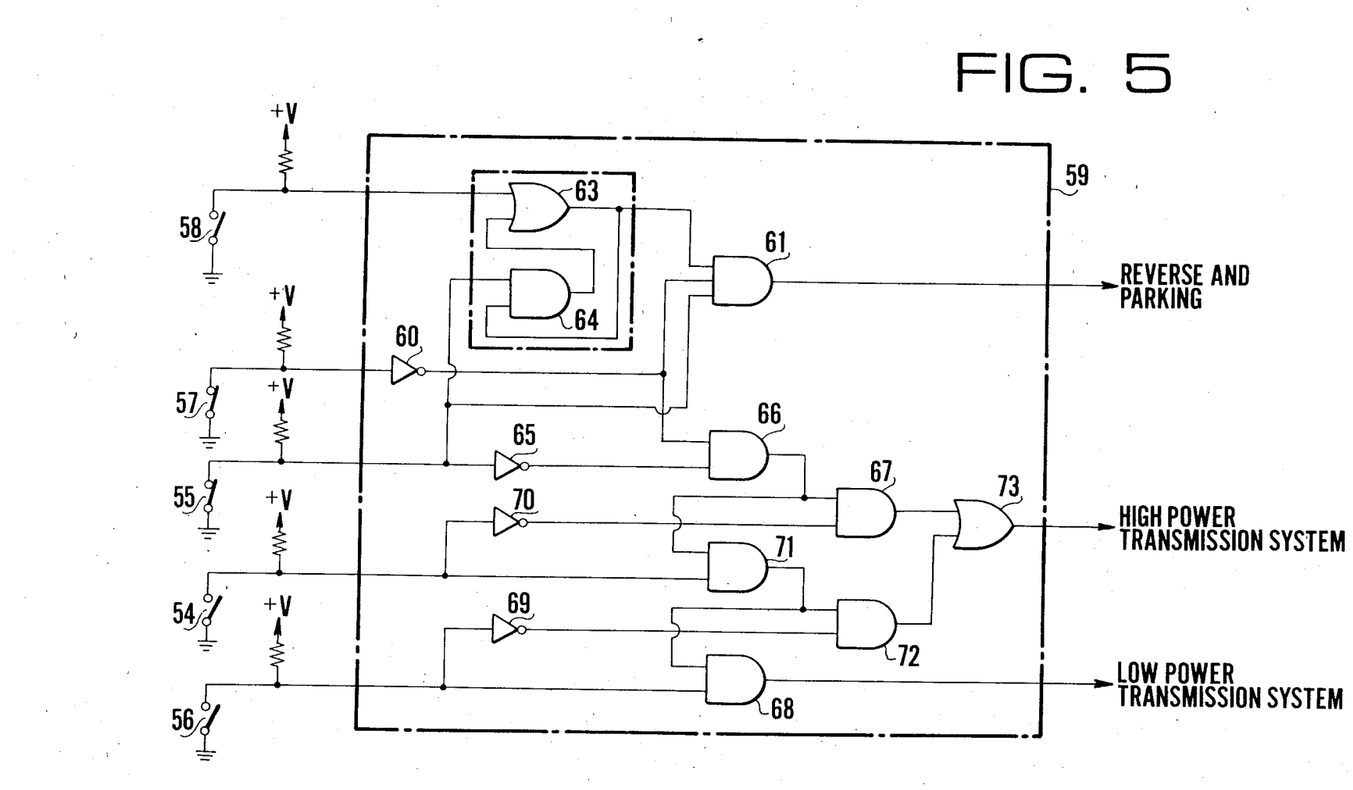
FIG. 5 shows an electric control circuit in a system of the present invention.

Referring to FIG. 5, when the automobile is at rest, the speed switch 58 is off and the neutral switch 57 is on, so that the output of an OR gate 63 is at a high level and the output of an inverter 60 is at a high level. Accordingly, when the RP select switch 55 is operated to off, all inputs of an AND gate 61 go to high levels and the output thereof goes to a high level. The high level output of the AND gate 61 is sent to a driver (not shown) which produces an output dependent on the input, so that the stepper motor 51 is operated in dependency on the output of the driver to move the shaft 40. The axial movement of the shaft 40 causes the select arm 44b to engage with the fork 39b of the shifter arm 39a. Thus, when the shift lever 30 is shifted to L or H position, reverse gears or parking gear engagement is performed.

When switches 55 and 56 are not operated and the temperature of the clutch is low, the output of an inverter 65 is at a high level and outputs of inverters 69 and 70 are at low levels. Accordingly, the outputs of AND gates 66, 71 and 68 are at high levels, and the outputs of AND gates 67, 72 and of an OR gate 73 are at low levels. Thus, the high level output of the AND gate 68, as a select signal of the low power transmission system, is sent to the stepper motor 51 through the driver to engage the shifter arm 44b with the fork 38b. Accordingly, when the shift lever 30 is shifted to the L position, the second speed driven gear 16b engages with the output shaft 15 through the synchronizing device 18, and when the shift lever 30 is shifted to the H position, the fourth speed gear engages.

When the high power transmission system select switch 56 is operated to engage the contacts, the output of an inverter 69 goes to a high level. Therefore, the output of the AND gate 72 goes to a high level. On the other hand, the output of the AND gate 68 goes to a low level. The high level output of the AND gate 72 causes the output of the OR gate 73 to go to a high level, which causes the shifter arm 44b to engage with the fork 37b for first and third speeds.

In the transmission system of the present invention, the gear ratio of the second speed gear set is selected to produce a sufficient torque to start the automobile, and the second gear ratio and the fourth gear ratio are such that the automobile can be driven only by the second and fourth gears on flat roads. On the other hand, the first and third gears are designed to get sufficient torque to drive the automobile at hills. Thus, the automobile can be driven by shifting the shift lever on the straight line.

Figure 7:
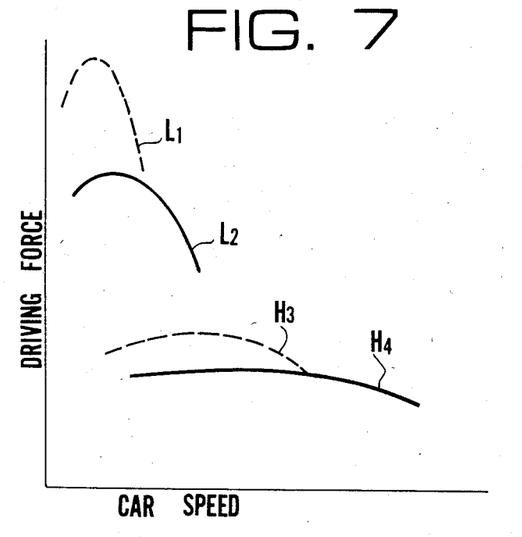
FIG. 7 is a graph showing a relationship between car speed and driving torque.

FIG. 7 shows the relationship between the car speed and torque by four gears. In order to enable the transmission to drive the automobile by two gears, gear ratios of the first and second gears ($L_1$, $L_2$) approximate each other and also gear ratios of the third and the fourth gears ($H_3$, $H_4$) are approximate, as shown in the graph. On the other hand, difference between the gear ratios of two gears is considerably large. Such a large difference in the gear ratio will cause jerking and stumbling of the automobile, if the clutch is rapidly engaged. Therefore, in the system, the clutch is so arranged as to gradually engage with a partial engagement.

Figure 6:
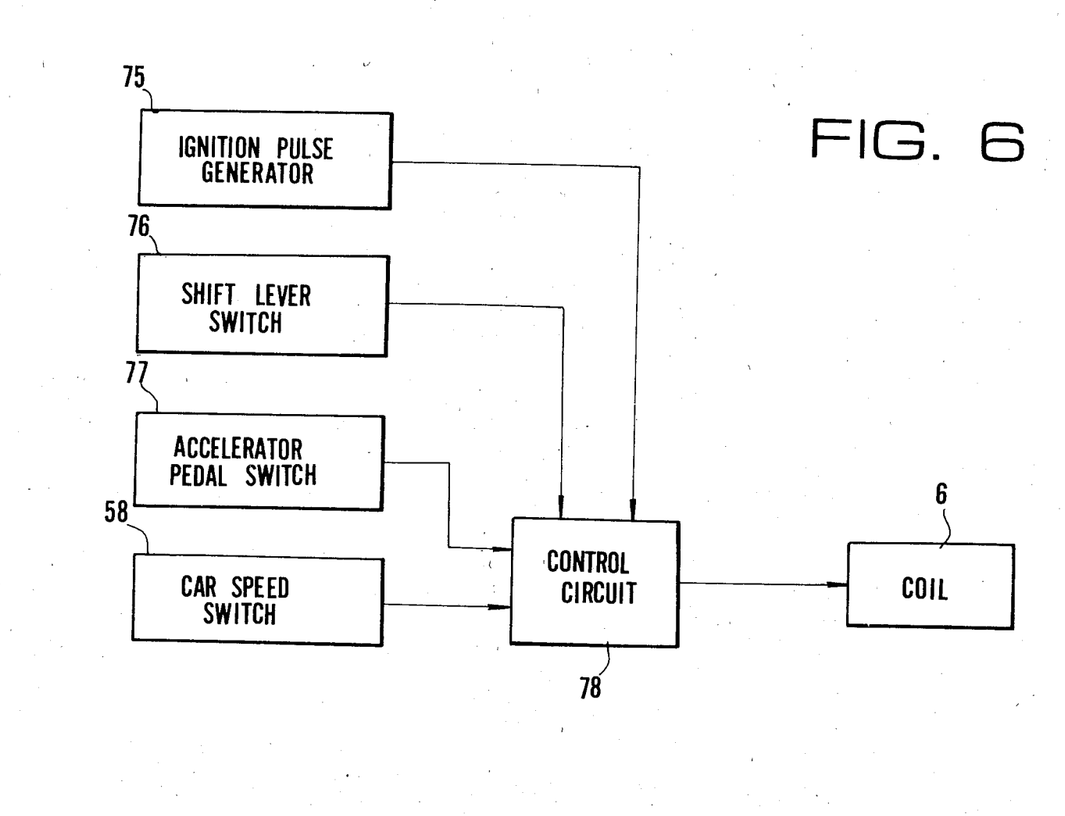
FIG. 6 is a block diagram of the system.
Figure 8:
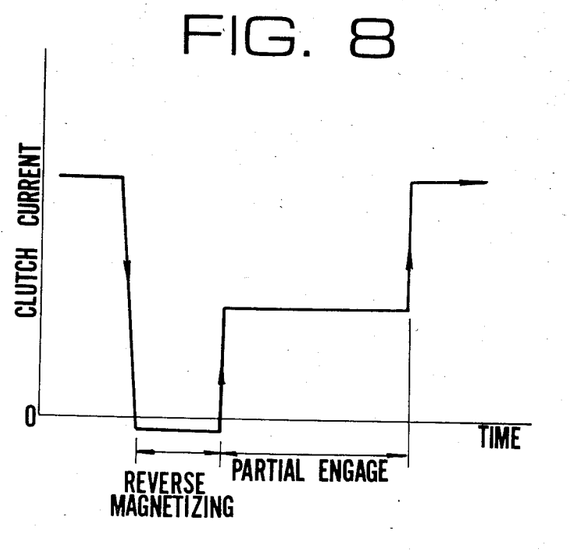
FIG. 8 is a graph showing a clutch current variation in the system.

FIG. 6 shows a clutch current control system for providing a partial engagement period in the clutch engaging period. The system comprises an ignition pulse generator 75, shift lever switch 76, accelerator pedal switch 77, car speed switch 58, and control circuit 78. The control circuit 78 operates in response to input signals applied thereto and controls clutch current flowing through the coil 6. The clutch current varies stepwise as shown in FIG. 8. When the shift lever 30 is shifted, the clutch current flows in the inverse direction to magnetize the drive member 7 in the opposite polarity to remove the residual magnetism. After the shift lever has been shifted, a low clutch current flows through the coil for providing a partial engagement for a relatively long time. After that, a rated current flows to entirely engage the clutch.

Such a long time partial engagement of the clutch will cause overheating of the clutch, if the automobile is frequently started. The system of the present invention is provided with a device for eliminating such a drawback. When the temperature of the clutch exceeds a predetermined temperature, the thermo switch 54 is turned on. Therefore, the output of the inverter 70 goes to a high level and the output of the AND gate 67 goes to a high level and outputs AND gates 71 and 68 go to low levels. Thus, the output of the OR gate 73 goes to a high level, and the high power transmission system is selected.

From the foregoing, it will be understood that the present invention provides a gearshift system for an automobile with an automatic clutch in which the transmission system is automatically changed from a low power transmission system to a high power transmission system when the temperature of the clutch exceeds a predetermined temperature, whereby overheating of the clutch can be prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A gearshift system for an automobile with an automatic clutch and a transmission having four forward-gear sets, comprising:

a first synchronizing device for selectively engaging a second speed gear and a fourth speed gear with an output shaft of said transmission, said second speed gear having a gear ratio producing a sufficient torque to start said automobile;

a second synchronizing device for selectively engaging a first speed gear and a third speed gear with said output shaft;

a first shifter means for operating said first synchronizing device;

a second shifter means for operating said second synchronizing device;

a select lever adapted to engage one of said first and second shifter means;

a manually operated shift lever;

means for transmitting the shift of said shift lever to said select lever for shifting one of said shifter means;

an electrical select device for operating said select lever means to engage with one of said shifter means;

switch means for producing signals representing a selection of one of said synchronizing devices;

a thermo switch responsive to the temperature of said automatic clutch for producing an output signal when the temperature exceeds a predetermined temperature; and control circuit means responsive to said signals of said switch means for operating said electrical select device to select one of said synchronizing devices, and responsive to said output signal of said thermo switch for operating said electrical select device to select said second synchronizing device.

2. The gearshift system for an automobile according to claim 1, wherein said automatic clutch is an electromagnetic clutch.

3. The gearshift system for an automobile according to claim 1, wherein said automatic clutch is an electromagnetic powder clutch.

4. The gearshift system for an automobile according to claim 1, wherein said each of first and second shifter means comprises a shifter rail operatively connected to a corresponding synchronizing device and a shifter arm secured to the shifter rail and having a fork adapted to be engaged with an end of said select lever, and said transmitting means comprises an actuating rod operatively connected to said shift lever at one end thereof, and a fork secured to said actuating rod at the other end thereof and engaged with the other end of said select lever.

5. The gearshift system for an automobile according to claim 1, wherein said electrical select device comprises a slidable select shaft rotatably engaged with said select lever at an axis of the select lever, and an electric actuator for axially sliding said select shaft, said select lever engages with said select shaft so as to be axially moved by the select shaft.

6. The gearshift system for an automobile according to claim 1, wherein said switch means comprises switches mounted on said shift lever.

7. The gearshift system for an automobile according to claim 1, wherein said control circuit means comprises a logic circuit responsive to said signals for producing output signals for operating said electrical select device.

* * * * *